(12) United States Patent
Houser et al.

(10) Patent No.: US 11,906,033 B2
(45) Date of Patent: Feb. 20, 2024

(54) SYSTEMS FOR A LUBRICATION CATCH (71) Applicant: Dana Heavy Vehicle Systems Group, LLC, Maumee, OH (US)

(72) Inventors: Jordan M. Houser, Sylvania, OH (US); Langston H. Corn, Sylvania, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 17/468,449

(22) Filed: Sep. 7, 2021

(65) Prior Publication Data

US 2023/0071421 A1 Mar. 9, 2023

(51) Int. Cl.
*F16H 57/04* (2010.01)

(52) U.S. Cl.
CPC ..... *F16H 57/0424* (2013.01); *F16H 57/0457* (2013.01)

(58) Field of Classification Search
CPC ............. F16H 57/0424; F16H 57/0457; F16H 57/045; F16H 57/0423
See application file for complete search history.

(56) References Cited

U.S. PATENT DOCUMENTS

| | | | |
|---|---|---|---|
| 3,529,698 A * | 9/1970 | Nelson | F16H 57/0447 184/6.12 |
| 4,347,759 A * | 9/1982 | Renk | F16N 7/28 74/606 R |
| 4,470,324 A * | 9/1984 | Renk | F16H 57/0423 74/606 R |
| 7,213,682 B2 * | 5/2007 | Gibson | F16H 57/0421 184/6.12 |
| 7,775,528 B2 * | 8/2010 | Berdichevsky | F16J 15/3244 277/559 |
| 8,657,073 B2 * | 2/2014 | Matsumoto | F16H 57/0483 184/6.12 |
| 8,899,381 B2 * | 12/2014 | Ebihara | F16H 57/0483 184/6.12 |
| 9,772,027 B2 * | 9/2017 | Preston | F16H 57/0457 |
| 10,746,282 B2 * | 8/2020 | Ito | F16H 48/08 |
| 10,767,752 B2 * | 9/2020 | Kawai | F16H 57/029 |
| 10,859,152 B2 * | 12/2020 | Yu | F16H 57/0475 |
| 10,955,041 B2 * | 3/2021 | Smith | F16H 57/0495 |
| 11,149,838 B2 * | 10/2021 | Hagino | F01M 9/06 |
| 11,465,885 B2 * | 10/2022 | Eastman | B66B 7/062 |
| 2006/0231337 A1 * | 10/2006 | Vogeltanz | F16N 7/36 184/6 |
| 2015/0234458 A1 | 8/2015 | Hsieh et al. | |

FOREIGN PATENT DOCUMENTS

| | | |
|---|---|---|
| CN | 104865702 A | 8/2015 |
| DE | 102004050235 A1 | 4/2006 |
| DE | 102012005118 A1 | 9/2013 |
| WO | 2014053238 A1 | 4/2014 |
| WO | 2021048363 A1 | 3/2021 |

* cited by examiner

*Primary Examiner* — Michael A Riegelman
(74) *Attorney, Agent, or Firm* — McCoy Russell LLP (57) ABSTRACT

Methods and systems are provided for a lubricant catching device. In one example, a system may include a device for capturing lubricant flowing in a clockwise direction and a counterclockwise direction. The device receives lubricant from a lubricated, rotating component.

20 Claims, 3 Drawing Sheets

SYSTEMS FOR A LUBRICATION CATCH

TECHNICAL FIELD

The present description relates generally to a device configured to distribute lubrication from a rotating component.

BACKGROUND AND SUMMARY

Vehicles may use one or more rotary components to provide locomotion in a desired direction. For example, vehicles may include transmissions, pinions, gears, axles, and other rotating components, all of which may demand lubrication. Some vehicles may include separate lubrication systems for each of these components. However, this may result in an increased packaging size and complexity.

Some approaches may include where a lubrication catch is configured to catch lubricant from the rotating components and direct the caught lubricant to other areas. However, since all rotating components do not rotate in the same direction, multiple design shapes may be needed to accurately catch and distribute the lubricant. Not only do different design shapes increase complexity, an assembly location and orientation are specific to each catch and component combination. This may increase assembly times while also presenting possible sources of error.

The inventors have identified the above issues and come up with a way to at least partially solve them. In one example, the issues described above may be addressed by a system for a device configured to capture lubricant directed in a clockwise and a counterclockwise direction via a first passage and a second passage. In this way, the device may not include a specific orientation with respect to the rotating component, thereby decreasing a likelihood of installation errors.

As one example, the device may be one of a plurality of devices, wherein each of the plurality of devices may be mounted adjacent to a rotating component of the vehicle. The plurality of devices may be mounted by aligning mounting holes independent of a direction of rotation of the rotating component. By doing this, an assembly worker may easily mount the device without complex assembly instructions, which may decrease manufacturing costs and times.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2 and 3 are shown approximately to scale, however, other relative dimensions may be used.

DETAILED DESCRIPTION

Figure 1:
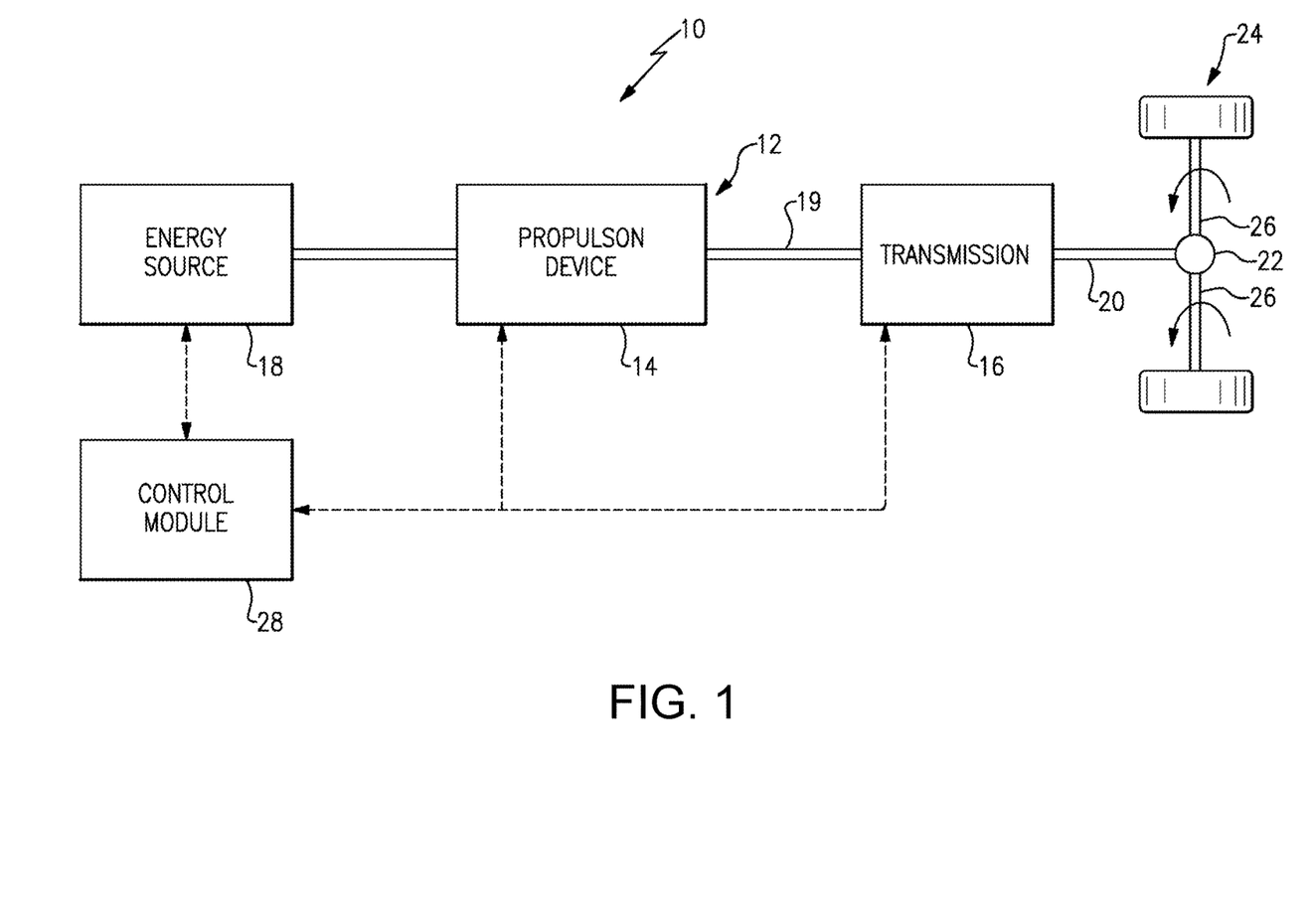
FIG. 1 illustrates a schematic of an at least partially electric vehicle.

The following description relates to systems for a device configured to distribute lubricant from a rotating component. The rotating component may be a gear, pinion, transmission, shaft, or other similar component of a vehicle, as illustrated in FIG. 1. In one example, the vehicle is an all-electric vehicle. However, the device may be arranged in internal combustion engine or partially electric vehicles without departing from the scope of the present disclosure. Additionally or alternatively, the device may be arranged in a locomotive, a plane, a boat, or other device.

Figure 2:
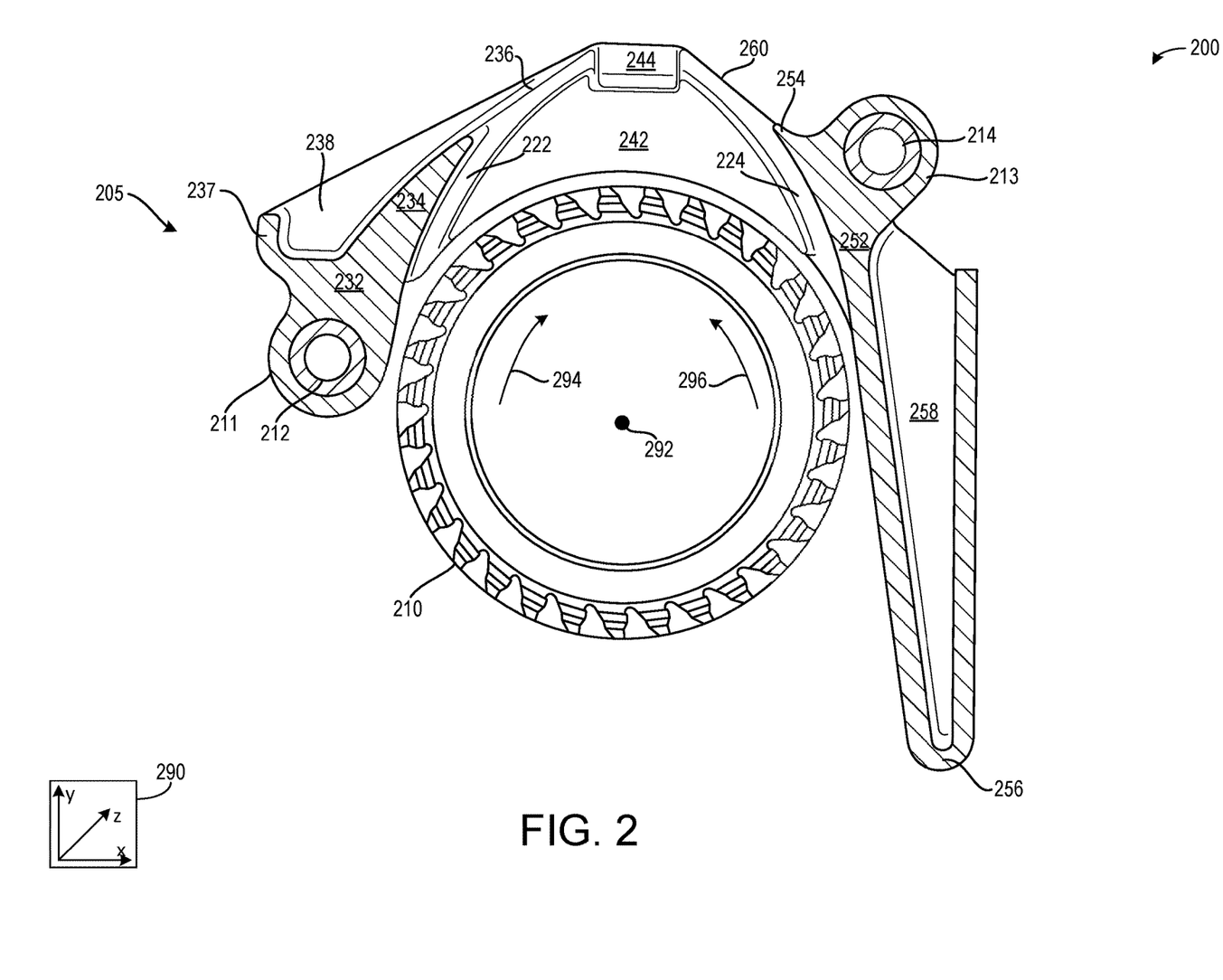
FIG. 2 illustrates a first view of a device.

The device is shown in a first view in FIG. 2, which illustrates a first side of the device interfacing with and capturing lubricant from the rotating component. A second side of the device is shown in a second view in FIG. 3. The second side may distribute lubricant to various sections which may be redistributed to other components.

Figure 3:
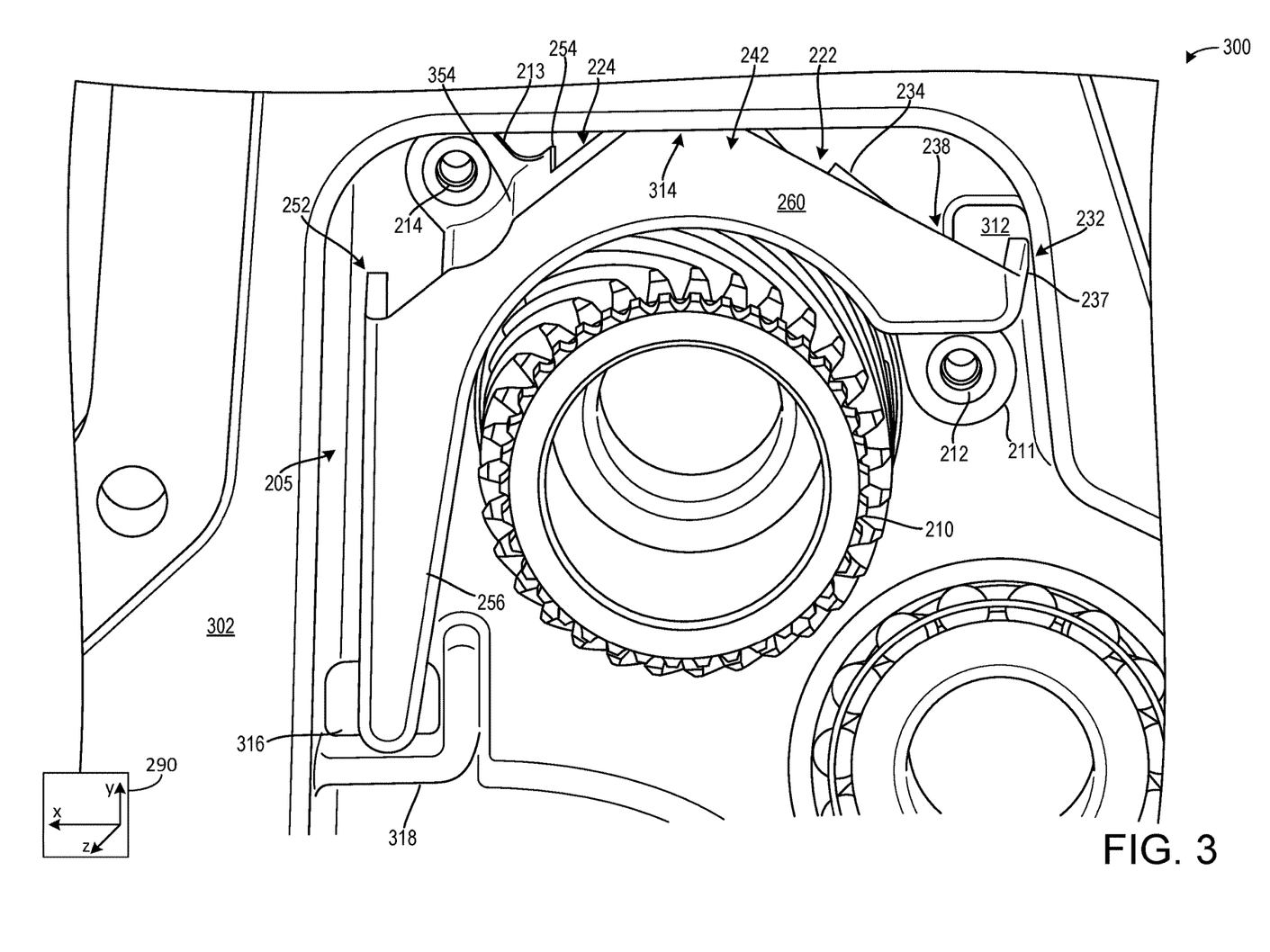
FIG. 3 illustrates a second view of the device.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 schematically illustrates a vehicle 10. This disclosure is applicable to many types of vehicle. For example, the vehicle 10 could be a conventional vehicle that is powered by an internal combustion engine, or could be an electrified vehicle that utilizes one or more electric machines in addition to, or as an alternative to, an engine.

The exemplary vehicle 10 includes a powertrain 12. The powertrain 12 may include a propulsion device 14 and a transmission 16 that is selectively driven by the propulsion device 14. The propulsion device 14 may be employed as an available drive source for the vehicle 10. For example, the propulsion device 14 could include an engine for a conventional vehicle, or an electric machine (i.e., an electric motor, a generator or a combined motor/generator) for an electrified vehicle.

The transmission 16 may include a gearbox having multiple gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission input shaft 19 and a transmission output shaft 20. The transmission 16 may alternatively be controlled to achieve an infinite number of ratios. These ratios can be achieved through mechanical reconfiguration as in a continuously variable transmission (CVT) or by electrical coordinate of the speeds of electric machines as in an electrically continuously variable transmission (eCVT). The transmission 16 may be automatically shifted from one ratio to another based on various vehicle and ambient operating conditions by an associated controller 28. The transmission 16 then provides powertrain output torque to the transmission output shaft 20. The transmission output shaft 20 may be connected to a differential 22. The differential 22 drives a pair of wheels 24 via respective axles 26 that are connected to the differential 22 to propel the vehicle 10.

An energy source 18 may supply power to the propulsion device 14. The energy source 18 may be a fuel system if the propulsion device 14 is an engine or a high voltage battery if the propulsion device 14 is an electric machine. For example, an engine is configured to consume fuel (i.e., gasoline, diesel, etc.) to produce a motor output, whereas the high voltage battery is configured to output and receive electrical energy that is consumed by the electric machine to produce a motor output.

The powertrain 12 of the vehicle 10 may additionally include an associated controller 28. While schematically illustrated as a single module, the controller 28 may be part of a larger control system and may be controlled by various other controllers throughout the vehicle 10, such as a vehicle system controller (VSC) that includes a powertrain control unit, a transmission control unit, engine control unit, etc. It should therefore be understood that the controller 28 and one or more other controllers can collectively be referred to as a "control module" that controls, such as through a plurality of integrated algorithms, various actuators in response to signals from various sensors to control functions associated with the vehicle 10. In one embodiment, the various controllers that make up the VSC may communicate with one another using a common bus protocol (e.g., CAN).

The controller 28 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 28 to control the vehicle 10.

The controller 28 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the controller 28 may communicate signals to and/or from the propulsion device 14, the transmission 16, and the energy source 18. In other words, these devices are in electrical communication with one another. Although not explicitly illustrated, those of ordinary skill in the art will recognize various functions or components that may be controlled by the controller 28 within each of the subsystems identified above.

The control logic stored on the controller 28 may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices that utilize electric, magnetic, and/or optical storage to keep executable instructions and associated calibration information, operating variables, and the like.

Turning now to FIG. 2, it shows an embodiment of a first view 200 of a device 205. The device 205 is arranged proximally to a rotating component 210. The rotating component 210 and the device 205 may be arranged in the vehicle 10 of FIG. 1. In one example, the rotating component is not a pump.

An axis system 290 is shown including three axes, namely an x-axis parallel to a horizontal direction, a y-axis parallel to a vertical direction, and a z-axis perpendicular to each of the x- and y-axes. An axis 292 illustrates a rotational axis of the rotating component 210.

The device 205 may include a plurality of mounting holes including a first hole 212 and a second hole 214. The first hole 212 may be arranged on a first protrusion 211 and the second hole 214 may be arranged on a second protrusion 213. The first protrusion 211 may extend in a direction opposite to the second protrusion 213. A first fastener, such as a bolt or screw, may extend through the first hole 212 and thread into a corresponding threaded opening of the vehicle. A second fastener may extend through the second hole 214 and thread into a separate threaded opening of the vehicle.

The device 205 is spaced away from the rotating component 210. The device 205 may be sized such that the device 205 is located higher and lower than the rotating component 210. In one example, the device 205 is configured to receive lubricant from only the rotating component 210, wherein the lubricant is thrown by the rotating component 210 as it rotates.

The device 205 may further include a plurality of recesses for receiving and directing lubricant received from the rotating component 210. More specifically, the rotating component 210 may receive lubricant from only the rotating component 210 as it directs at least some of the lubricant in a clockwise direction or a counterclockwise direction.

A first passage 222 may be shaped by one of the plurality of recesses. The first passage 222 may be configured to receive lubricant directed from the rotating component 210 in the clockwise direction. A second passage 224 may be shaped by one of the plurality of recesses and configured to receive lubricant directed from the rotating component 210 in a counterclockwise direction. The clockwise direction is shown via an arrow 294 and the counterclockwise direction is shown via an arrow 296. In one example, the first passage 222 and the second passage 224 are symmetric about the y-axis such that an orientation of an installation of the device 205 may be simplified relative to orientation specific lubricant catch devices.

The first passage 222 and the second passage 224 may correspond to recesses arranged between thicker portions of the device 205. Specifically, the first passage 222 is arranged between a first portion 232 and a second portion 242. The second passage 224 is arranged between the second portion 242 and a third portion 252.

The first passage 222 may curve in a direction toward the third portion 252 and the second passage 224 may curve in a direction toward the first portion 232. The first portion 232 may include a narrowing portion 234, adjacent to the first passage. At an extreme end of the narrowing portion 234, the device 205 includes a first dip 236 corresponding to a change in thickness of the device 205. A first collecting region 238 may be arranged on a first side of the first dip 236 and the first passage 222 may be arranged on the second side of the first dip 236.

In one example, the device 205 may include multiple thicknesses, including a first thickness corresponding to the first portion 232, a second thickness corresponding to the first passage 222, and a third thickness corresponding to the first collecting region 238. The first thickness may be greater than the second thickness, which may be greater than the third thickness. Thicknesses of the device 205 may be measured from a face-plate 260 along the z-axis.

Lubricant in the first passage 222 may flow to the first collecting region 238. Lubricant may be contained in the first collecting region 238 via the narrowing portion 234 and a J-hooked portion 237 of the first portion 232. The J-hooked portion 237 may include a linear portion and a curved portion. The curved portion and the narrowing portion 234 may interface with the first protrusion 211, thereby shaping the first portion 232. The linear portion extends from the curved portion of the J-hooked portion 237. Lubricant in the first collecting region 238 may flow through a first outlet to another component or region demanding lubricant. The first outlet is described in greater detail with respect to FIG. 3.

The first passage 222 may be further shaped to direct lubricant to a second collecting region 244. Additionally, the second passage 224 may be shaped to direct lubricant to the second collecting region 244. The second collecting region 244 may include the third thickness similar to the first collecting region 238, wherein lubricant may be contained within the second collecting region 244 via the first thickness of the second portion 242. In one example, the second collecting region 244 is fluidly coupled to a second outlet. In one example, the second outlet may flow lubricant to a similar or different region of the vehicle than the first outlet.

The first passage 222, the second passage 224, the second portion 242, and the second collecting region 244 may be reflectively symmetric about the y-axis.

The third portion 252 may include a tail portion 254. The tail portion 254 may extend in a direction toward the second collecting region 244. In one example, the tail portion 254 is continuous with the second protrusion 213. The tail portion 254 may narrow in width in the direction toward the collecting region 244 and a thickness of the tail portion 254 may be equal to the first thickness along with the rest of the third portion 252.

The third portion 252 may further include a V-shaped section 256. The V-shaped section 256 may include a first wall extending from the second protrusion 213. The first wall may extend toward a curved extreme end from which a second wall may extend. The second wall may extend toward the second protrusion 213, wherein the second wall is spaced away from and does not contact the second protrusion 213.

A third collecting region 258 may be shaped by the V-shaped section 256. Lubricant in the third collecting region 258 may be contained therein via the V-shaped section 256 and only allowed to exit via a third outlet, shown in FIG. 3.

Turning now to FIG. 3, it shows a second view 300 of the device 205. As such, components previous introduced may be similarly numbered in this figure. The second view 300 illustrates a face-on view of the face plate 260. The device 205 may be a single, continuous piece. The device 205 may include one or more of a plastic, a metal, a ceramic, or the like. The device 205 may be manufactured via additive manufacturing, injection mold, or other process. An entirety of the device 205, including each of the first portion 232, the second portion 242, and the third portion 252 may include a J-shape. More specifically, the third portion 252 may be substantially linear and the first portion 232 and the second portion 242 may curve in a C-shape from one end of the third portion 252. Said another way, an extreme end of the third portion 252 may be a vertically lowest portion of the device 205, wherein the device 205 may curve upward to a highest vertical portion corresponding to a top of the second portion 242 and then curve downward to a middle vertical portion corresponding to the first portion 232, vertically closer to the second portion 242 than the third portion 252.

The device 205 may be physically coupled to a housing 302 of the rotating component 210. A combination of the face plate 260 and a surface of the housing 302 may contain lubricant receive by the first and second passages 222, 224. A first outlet 312, a second outlet 314, and a third outlet 316 may be configured to redirect the lubricant from the housing 302 to a different portion of the vehicle requesting lubricant.

The first outlet 312 may be configured to receive lubricant from the first collecting region 238 of the first portion 232. As shown, the first portion 232 includes a cup-shape via a combination of the narrowing portion 234, the J-hooked portion 237, and the face plate 260. Lubricant arranged in the first collecting region 238 may exit therefrom via only the first outlet 312.

The second outlet 314 may be configured to receive lubricant from the second collecting region (e.g., second collecting region 244). The first passage and the second passage 222, 224 flow lubricant to the second collecting region, wherein lubricant in the second collecting region may exit therefrom via only the second outlet 314.

The third outlet 316 may be surrounded by a guiding wall 318. The guiding wall 318 may include an L-shape including a first wall extending in a horizontal direction and a second wall extending in a vertical direction toward the device 205. Lubricant from the third collecting region (e.g., third collecting region 258 of FIG. 2) may flow into and be contained within a volume shaped by the guiding wall 318 and the surface of the housing 302. The lubricant may then flow into the third 316 and toward another region of the vehicle.

The third collecting region 258 may receive lubricant from the second passage 224 via an outer channel 354. The outer channel 354 may extend from the face plate 260 to the second protrusion 213. The outer channel 354 may include a depression or recess configured to promote lubricant flow from the second passage 224 to the third collecting region.

The device 205 may be configured to receive lubricant from an upper region of the rotating component 210 via the first and second passages 222, 224. The first passage 222 may flow lubricant to each of the first collecting region 238 and the second collecting region. In one example, the second collecting region may be vertically higher than the first collecting region. The second passage 224 may flow lubricant to each of the second collecting region and the third collecting region. The third collecting region may be vertically lower than each of the first collecting region and the second collecting region. In one example, the locations of the collecting regions may be based on a lubricant demand of a region or a component to which corresponding outlets are fluidly coupled. For example, the third collecting region may be in a lowest position in response to a device or a region which receive lubricant from the third outlet 316 having a higher lubricant demand. The first outlet 312 may be fluidly coupled to a device or a region which has a mid-lubricant demand and the second outlet 314 may be fluidly coupled to a device or a region which has a low lubricant demand. In this way, features and contours of the device 205 may be further shaped to promote lubricant flow based on lubricant demands.

An embodiment of a system, comprising a device configured to capture lubricant directed in a clockwise direction and a counterclockwise direction via a first passage and a second passage. A first example of the system further includes a first collecting region fluidly coupled to the first passage, and wherein the first collecting region is further fluidly coupled to a first outlet of a housing of a rotating device. A second example of the system, optionally including the first example, further includes where the rotating device is lubricated and throws lubricant in the clockwise direction or the counterclockwise direction. A third example of the system optionally including one or more of the previous examples further includes a second collecting region fluidly coupled to the first passage and the second passage, wherein the second collecting region is fluidly coupled to a second outlet of the housing of the rotating device. A fourth example of the system optionally including one or more of the previous examples further includes a third collecting region fluidly coupled to the second passage, wherein the third collecting region is further fluidly coupled to a third outlet of the housing of the rotating device. A fifth example of the system optionally including one or more of the previous examples further includes the device is mounted to a housing of a rotating component. A sixth example of the system optionally including one or more of the previous examples further includes the rotating component is one of a transmission, pinion, gear, or axle. A seventh example of the system optionally including one or more of the previous examples further includes the device is configured to receive lubricant from only a rotation of a rotating component.

An embodiment of a device for capturing lubricant flowing in a clockwise direction or a counterclockwise direction based on a rotation of a rotating component, the device comprises a first collecting region arranged at a first portion of the device, the first collecting region fluidly coupled to a first outlet of a housing of the rotating component, a second collecting region arranged at a second portion of the device, the second collecting region fluidly coupled to a second outlet of the housing of the rotating component, a third collecting region arranged at a third portion of the device, the third collecting region fluidly coupled to a third outlet of the housing of the rotating component, a first passage fluidly coupled to the first collecting region and the second collecting region, the first passage configured to receive lubricant flowing in the clockwise direction, and a second passage fluidly coupled to the second collecting region and the third collecting region, the second passage configured to receive lubricant flowing the counterclockwise direction, wherein the first passage, the second passage, and the second portion comprise reflection symmetric about an axis. A first example of the device further includes where the first passage and the second passage are curved toward one another and the second collecting region. A second example of the device, optionally including the first example, further includes where the first collecting region, the second collecting region, and the third collecting region comprises a thickness less than a thickness of the first passage and the second passage. A third example of the device optionally including one or more of the previous examples further includes where the first passage and the second passage are arranged above the rotating component. A fourth example of the device optionally including one or more of the previous examples further includes where the third portion comprises a V-shape. A fifth example of the device optionally including one or more of the previous examples further includes where the device is a single, continuous piece, and wherein the third portion comprises a linear shape and the second and first portions comprise a curved shape to form a J-shape. A sixth example of the device optionally including one or more of the previous examples further includes where the device extends vertically above and vertically lower than the rotating component.

An embodiment of a system, comprises a rotating component configured to receive lubricant, a device spaced away from the rotating component and configured to receive lubricant from only the rotating component flowing in a clockwise direction and a counterclockwise direction, the device comprising a first collecting region arranged at a first portion of the device, the first collecting region fluidly coupled to a first outlet of a housing of the rotating component, a second collecting region arranged at a second portion of the device, the second collecting region fluidly coupled to a second outlet of the housing of the rotating component, a third collecting region arranged at a third portion of the device, the third collecting region fluidly coupled to a third outlet of the housing of the rotating component, a first passage fluidly coupled to the first collecting region and the second collecting region, the first passage configured to receive lubricant flowing in the clockwise direction, and a second passage fluidly coupled to the second collecting region and the third collecting region, the second passage configured to receive lubricant flowing the counterclockwise direction, wherein the first passage, the second passage, and the second portion comprise reflection symmetric about an axis. A first example of the system further includes where the device comprises a first hole arranged on a first protrusion of the first portion and a second hole arranged on a second protrusion of the second portion, wherein fasteners extend through the first hole and the second hole and mount the device to the housing of the rotating component. A second example of the system, optionally including the first example, further includes where the first outlet, second outlet, and third outlet are fluidly separate from one another and direct lubricant to different regions of the system. A third example of the system, optionally including one or more of the previous examples, further includes where the second outlet is vertically higher than the first outlet, and wherein the first outlet is vertically higher than the third outlet. A fourth example of the system, optionally including one or more of the previous examples, further includes where the device is asymmetric, and wherein a section of the device comprising the first passage, the second passage, and the second portion is symmetric.

The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a device configured to capture lubricant directed in a clockwise direction and a counterclockwise direction via a first passage and a second passage, wherein the device is a single, continuous piece and comprises a first collecting region, a second collecting region, and a third collecting region, wherein the third collecting region extends vertically lower than the first and second collecting regions and a rotating device, and wherein:
      the rotating device rotates about an axis of rotation;
      the first collecting region is positioned on a first side of the rotating device and the axis of rotation;
      the second collecting region is positioned vertically above the rotating device and vertically above the axis of rotation;
      the third collecting region is positioned on a second side of the rotating device and the axis of rotation, the second side being opposite the first side with the rotating device and the axis of rotation therebetween;
      the third collecting region extends vertically on the second side from vertically above the axis of rotation to vertically lower than the rotating device; and
      no part of the first collecting region, the second collecting region, or the third collecting region extends to a region vertically under the rotating device and the axis of rotation.

2. The system of claim 1, wherein the first collecting region fluidly coupled to the first passage, and wherein the first collecting region is further fluidly coupled to a first outlet of a housing of the rotating device.

3. The system of claim 2, wherein the rotating device is lubricated and throws lubricant in the clockwise direction or the counterclockwise direction.

4. The system of claim 2, wherein the second collecting region fluidly coupled to the first passage and the second passage, wherein the second collecting region is fluidly coupled to a second outlet of the housing of the rotating device.

5. The system of claim 2, wherein the third collecting region fluidly coupled to the second passage, wherein the third collecting region is further fluidly coupled to a third outlet of the housing of the rotating device.

6. The system of claim 1, wherein the device is mounted to a housing of a rotating component.

7. The system of claim 6, wherein the rotating component is one of a transmission, pinion, gear, or axle.

8. The system of claim 1, wherein the device is configured to receive lubricant from only a rotation of a rotating component.

9. A device for capturing lubricant flowing in a clockwise direction or a counterclockwise direction based on a rotation of a rotating component, the device comprising:
   a first collecting region arranged at a first portion of the device, the first collecting region fluidly coupled to a first outlet of a housing of the rotating component;
   a second collecting region arranged at a second portion of the device, the second collecting region fluidly coupled to a second outlet of the housing of the rotating component;
   a third collecting region arranged at a third portion of the device, the third collecting region fluidly coupled to a third outlet of the housing of the rotating component, wherein the device comprising the first collecting region, the second collecting region, and the third collecting region is a single, continuous piece;
   a first passage fluidly coupled to the first collecting region and the second collecting region, the first passage configured to receive lubricant flowing in the clockwise direction; and
   a second passage fluidly coupled to the second collecting region and the third collecting region, the second passage configured to receive lubricant flowing the counterclockwise direction, wherein:
      the first passage, the second passage, and the second portion comprise reflection symmetric about an axis of symmetry;
      the rotating component rotates about an axis of rotation;
      the first collecting region is positioned on a first side of the rotating component and the axis of rotation;
      the second collecting region is positioned vertically above the rotating component and vertically above the axis of rotation;
      the third collecting region is positioned on a second side of the rotating component and the axis of rotation, the second side being opposite the first side with the rotating component and the axis of rotation therebetween;
      the third collecting region extends vertically on the second side from vertically above the axis of rotation to vertically lower than the rotating component; and
      no part of the first collecting region, the second collecting region, or the third collecting region extends to a region vertically under the rotating component and the axis of rotation.

10. The device of claim 9, wherein the first passage and the second passage are curved toward one another and the second collecting region.

11. The device of claim 9, wherein the first collecting region is vertically between the second collecting region and the third collecting region.

12. The device of claim 9, wherein the first passage and the second passage are arranged above the rotating component.

13. The device of claim 9, wherein the third portion comprises a V-shape.

14. The device of claim 9, wherein the device is a single, continuous piece, and wherein the third portion comprises a linear shape and the second and first portions comprise a curved shape to form a J-shape.

15. The device of claim 9, wherein the device extends vertically above and vertically lower than the rotating component.

16. A system, comprising:
a rotating component configured to receive lubricant;
a device spaced away from the rotating component and configured to receive lubricant from only the rotating component flowing in a clockwise direction and a counterclockwise direction;
the device comprising a first collecting region arranged at a first portion of the device, the first collecting region fluidly coupled to a first outlet of a housing of the rotating component;
a second collecting region arranged at a second portion of the device, the second collecting region fluidly coupled to a second outlet of the housing of the rotating component;
a third collecting region arranged at a third portion of the device and vertically extending lower than the rotating component, the third collecting region fluidly coupled to a third outlet of the housing of the rotating component, wherein the device is a single, continuous piece;
a first passage fluidly coupled to the first collecting region and the second collecting region, the first passage configured to receive lubricant flowing in the clockwise direction; and
a second passage fluidly coupled to the second collecting region and the third collecting region, the second passage configured to receive lubricant flowing the counterclockwise direction, wherein:
the first passage, the second passage, and the second portion comprise reflection symmetric about an axis of symmetry;
the rotating component rotates about an axis of rotation;
the first collecting region is positioned on a first side of the rotating component and the axis of rotation;
the second collecting region is positioned vertically above the rotating component and vertically above the axis of rotation;
the third collecting region is positioned on a second side of the rotating component and the axis of rotation, the second side being opposite the first side with the rotating component and the axis of rotation therebetween;
the third collecting region extends vertically on the second side from vertically above the axis of rotation to vertically lower than the rotating component; and
no part of the first collecting region, the second collecting region, or the third collecting region extends to a region vertically under the rotating component and the axis of rotation.

17. The system of claim 16, wherein the device comprises a first hole arranged on a first protrusion of the first portion and a second hole arranged on a second protrusion of the second portion, wherein fasteners extend through the first hole and the second hole and mount the device to the housing of the rotating component.

18. The system of claim 16, wherein the first outlet, second outlet, and third outlet are fluidly separate from one another and direct lubricant to different regions of the system.

19. The system of claim 16, wherein the second outlet is vertically higher than the first outlet, and wherein the first outlet is vertically higher than the third outlet.

20. The system of claim 16, wherein the device is asymmetric, and wherein a section of the device comprising the first passage, the second passage, and the second portion is symmetric.

* * * * *

UNITED STATES PATENT AND TRADEMARK OFFICE
CERTIFICATE OF CORRECTION

| | | |
|---|---|---|
| PATENT NO. | : 11,906,033 B2 | |
| APPLICATION NO. | : 17/468449 | |
| DATED | : February 20, 2024 | |
| INVENTOR(S) | : Jordan M. Houser and Langston H. Corn | |

It is certified that error appears in the above-identified patent and that said Letters Patent is hereby corrected as shown below:

On the Title Page

Item (72), please correct the inventor listing as stated below:
Jordan M. HOUSER, Sylvania, OH (US);
Langston H. CORN, Sylvania, OH (US);
Daniel D. CARMEAN, Swanton, OH (US)

Signed and Sealed this
Fourth Day of June, 2024

*Katherine Kelly Vidal*

Katherine Kelly Vidal
*Director of the United States Patent and Trademark Office*